3,836,614
TIRE CURING MONITORING AND CONTROL METHOD

Ernst J. Neugroschl, Akron, Ohio, assignor to The Goodyear Tire & Rubber Company, Akron, Ohio
Original application Aug. 6, 1968, Ser. No. 750,512, now Patent No. 3,659,974. Divided and this application Nov. 5, 1971, Ser. No. 196,243
Int. Cl. B29h 5/00, 17/00
U.S. Cl. 264—40                    1 Claim

ABSTRACT OF THE DISCLOSURE

In the process of molding and curing pneumatic tires, a means senses certain selected quantities (e.g., cure cycle length) in the tire press and, in some applications, a post cure inflator, and feeds the sensed signals to a digital computer. The computer scans the input and compares it with pre-stored ideal values. If the sensed data differs from the stored values by too great a degree, the computer provides an appropriate output. Further, the computer may control a tire marker to mark those tires which fail the comparison. In addition, by feeding information to the computer from a plurality of presses, accurate inventory counts, production requirements, production and press break-down history, and so forth, may be maintained automatically.

---

This application is a division of my application Ser. No. 750,512 filed Aug. 6, 1968 and entitled "Tire Curing Apparatus Monitoring and Control" and U.S. Letters Patent 3,659,974.

This invention relates to a method for monitoring input, operation and output of pneumatic tire molding and curing apparatus.

Modern tire plants contain a multitude of tire presses, each press capable of molding and curing (vulcanizing) as many as two tires every 15 to 20 minutes. In view of the increasing number of tire brands which must be produced in a large variety of tire sizes, the task of quality control, production scheduling, inventory control, maintenance, and so forth, have become most difficult. Further, the high cost of tire press equipment requires high utilization of such equipment to make most efficient use of total press capacity.

In older tire plants, counters, recorders and apparatus gauges are located at each tire press where they must be visually monitored. Since supervision and collection of data from individual counters is cumbersome and inefficient, a press malfunction or break-down is not detected immediately. The consequence is slowed production and inefficient use of total press capacity.

In newer plants, there has been a tendency to centralize counters and some recorders or gauges of at least sections of presses or of some selected variables in central control rooms. While this expediency speeds production monitoring, it still lags far behind the ideal.

In this invention, a system is provided whereby sensors located at each press are connected at a central point to the input of a data processing system. A digital computer repetitively scans the input terminals to monitor the operation of each press. Counts of uncured tires fed to the presses are kept; steps in the molding and curing process are monitored for quality control by comparing the sensed parameters against pre-determined stored acceptable ranges of values; cured tires may be marked according to quality at the output of each press; and, accurate production reports, machine malfunction reports, and so forth, are maintained. All outputs of this system are available immediately to supervisory personnel.

It is therefore an object of this invention to provide a method for automatically monitoring and checking the operation of tire molding and curing apparatus.

It is another object of this invention to provide count of numbers of uncured tires fed into plant presses.

It is a further object of this invention to provide an inventory of tires molded and cured.

It is still another object of this invention to automatically compare ideal data against sensed data and provide exception messages when the comparison shows too great a departure from ideal values.

It is a still further object of this invention to mark tires as they leave the presses with quality marks determined by the automatic comparisons.

It is a further object of this invention to provide a method which will make all the necessary production and quality control information available upon demand.

These and other objects of this invention will become readily apparent by reference to the following specification and drawings, wherein.

This specification will set forth only information sufficient to understand the combination of the invention. It is not intended that this invention be limited to any single type or brand of tire press or post cure inflator. To the extent such devices differ slightly between manufacturers, a person skilled in this art could make the necessary modifications in this invention without departing from the scope thereof.

In the manufacturing of pneumatic tires, the components are assembled into uncured tires. Both bias ply uncured tires and radial ply uncured tires are placed automatically into the lower cavity of a tire press. As the upper cavity is lowered, an inflatable rubber bladder, or other means, is used to inflate the uncured tire, forcing it outwardly against the mold. When the upper cavity is completely lowered and the mold is closed, the bladder or other means presses the tire against the mold on all sides, and the tire takes on the tread design and markings carried by the mold.

Pressurized heated steam or other agent inflates the bladder or other means and heat is applied to the mold to cure the tire. In a typical passenger car tire, for example, steam at a first pressure of approximately 100 p.s.i. and then approximately 200 p.s.i. and a temperature of approximately 300° F. is used to inflate the bladder. Curing time varies, depending upon the tire design and rubber compound, from 15 to 20 minutes in the case of the example tire above, to several hours in large earthmover tires.

As is well known, many tire curing processes include, subsequent to the molding of the tire in the press, a post cure inflation operation which comprises inflating the tire with air to a pressure which may be in the range of normal inflation pressure for the tire and permitting the tire to cool while so inflated. Generally the length of the post cure inflation cycle is twice the length of the cure cycle.

Use of the phrase "tire molding and curing apparatus" in the specification and claims herein is intended to encompass both a tire press alone and in combination with a post cure inflator.

It must be stressed that while ranges of time, temperature and pressure have been given, the value of each for any one tire is quite narrow. Each parameter is determined by the tire design and particular rubber compound used. Even slight variations from the prescribed parameters can result in a low grade tire. Further large variation may result in the necessity of the tire being scrapped.

Figure 1:
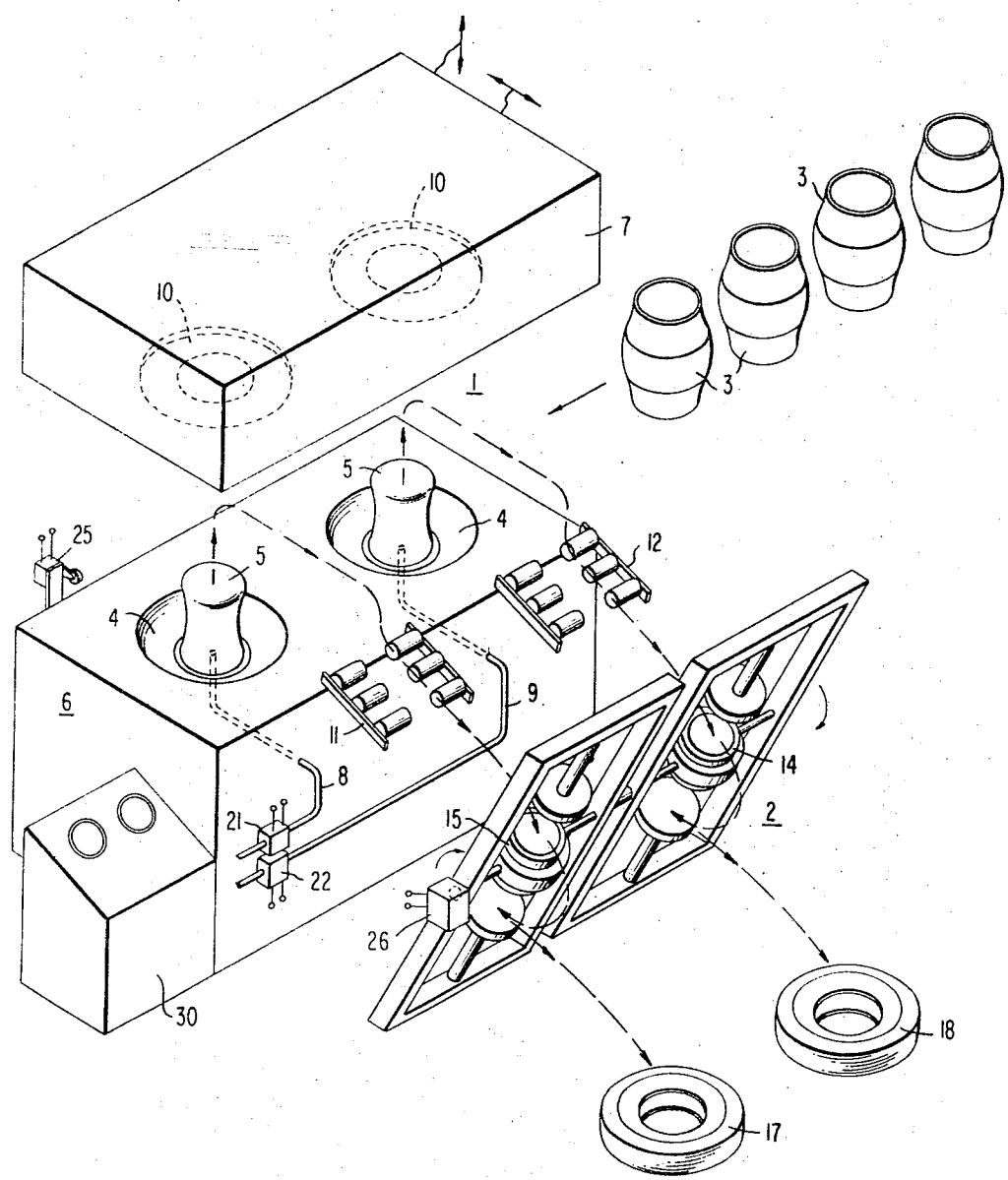
FIG. 1 is a generalized illustration of a tire press and post cure inflator.

Referring to FIG. 1, a generalized tire press 1 and post cure inflator 2 is illustrated. Uncured tires 3 are fed two at a time by automatic equipment (not shown) into lower cavities 4 of lower half 6 of the tire press. The uncured tires 3 are placed in the cavities around inflatable curing bladders 5.

After the uncured tires are positioned around the bladders in lower cavities 4, the upper half 7 of the tire press closes downwardly. As the press closes, steam lines 8, 9 deliver heated high pressure steam to the curing bladders, causing them to expand and mold the uncured tires against upper and lower cavities 10, 4 of the tire press. By regulation of steam pressure and temperature by means of a timing device (not shown), the proper heat is delivered to the curing tires.

After the prescribed curing time is completed, upper press half 7 raises, ejecting the hot tires onto delivery rollers 11, 12. If the tires are to undergo post cure inflation, they are mounted on the upper side of mandrels 14, 15 by automatic devices (not shown) and air inflated as described above.

The length of the curing cycle and the sequence and values of temperature and pressure are critical in the production of tires. Undercure results in insufficient molecular cross-ties, producing a weak rubber. If the rubber is overcured, the rubber is excessively cross-tied, generally producing an inelastic, brittle rubber.

When post cure inflation is utilized, the time interval between ejection of the tire from press 1 and mounting and inflation on post cure inflator 2 is critical. Depending upon tire type and rubber compound, the time interval will fall in the range of 20 to 120 seconds.

At the same time a pair of tires is ejected from the press and mounted on post cure inflator 2, a further pair of uncured tires is automatically loaded into the press. Since press cure time is approximately one-half post cure time, the second pair of tires is ready for ejection half way through the post cure cycle of the first pair. As the second pair is ejected onto delivery rollers 11, 12, post cure inflator 2 is turned over, so that the second tire pair may be rimmed and inflated on the side of mandrels 14, 15 opposite the first pair. When a third tire pair is ejected from press 1, the post cure cycle of the first tire pair is completed and they are ejected as finished tires 17 and 18. The post cure inflator then turns over so that the third tire pair may be rimmed and inflated in the empty positions.

Parameters of the curing process are detected according to this invention by electrical sensors. Inflation of bladders 5 is detected by pressure switches 21, 22 which are of conventional design. The pressure at which switches 21, 22 operate may be varied, but they must function at a pressure well below the minimum operating inflation pressure of the bladders. In the use of this invention, it has been found that 65 p.s.i. is a satisfactory operating pressure for the switches.

Opening and closing of the mold is sensed by contact switch 25. Turn-over of the post cure inflator is detected by contact switch 26.

The press is controlled by circuitry located in control cabinet 30. A typical controller consists of the well known timer cam in which a number of cams are mounted on an extended shaft which is turned at a constant rate. A cycle of the press and post cure inflator is controlled by one full turn of the timer shaft. Cams on the shaft contact switches to operate the various press and inflator functions.

Figure 2:
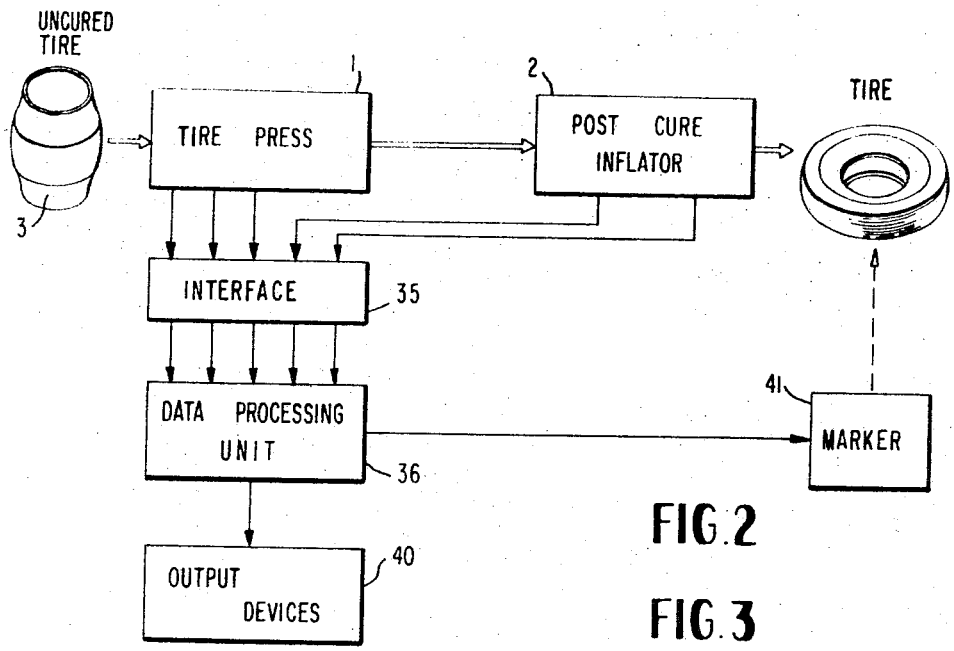
FIG. 2 is a block-diagram of the system according to this invention, incorporating a single tire press and post cure inflator.

FIG. 2 illustrates the combination of this invention including a single tire press and post cure inflator. It should be understood that any number of presses and inflators may be connected into the combination of FIG. 2 in parallel with the single units illustrated. Further, a post cure inflator will not be used in all applications to which this invention is used. In those cases where no post cure inflator is utilized, marker 41 marks tires as they emerge from press 1.

Signals generated during the operation of press 1 and inflator 2 are fed to interface circuit 35. The interface converts the signals to a voltage and form acceptable by the input terminals of data processing unit 36. Unit 36 performs comparisons between sensed data and stored data under control of a computer program which will be discussed in detail below.

A detailed explanation of the operation of data processing unit 36 will be given below. For the present, it is sufficient to understand the forms the various output signals may take. If the unit determines that sensed data lies without allowable ranges, it generates signals which cause output device 40, which may take the form of a printer, to print an exception message. This message states the problem, such as "overcure," and identifies the offending press cavity or post cure inflator stage. At the same time as the exception message is generated, marker 41 may be controlled to appropriately mark the overcured tire. For marking purposes, color coded paint sprays may be used. The color of the spray is determined by the degree of variance from predetermined standards. Depending on the variance, the spray may indicate a second or third grade tire or a tire which must be scrapped. Alternatively, marker 41 could magnetically or otherwise encode grade designations on strips carried by the tires. In this fashion, the tire could be machine sorted.

Operation of the steam pressure switches 21, 22 (FIG. 1) indicates that uncured tires have been loaded. Operation of the post cure inflator turn-over switch 26 (FIG. 1), absent an intervening exception message, indicates the production of acceptable tires. All such signals are loaded into memory in data processing unit 36 and retained until they are read out. At appropriate times, this data is read out to device 40 and transferred to another digital storage medium such as discs. Once on the discs, the data is printed out in a format under the control of a program not part of this invention. These production reports may be made available to supervisory personnel in a proper format whenever they are needed. As may be appreciated by anyone skilled in the art, output device 40 may take whatever form is needed to produce a desired output.

Figure 3:
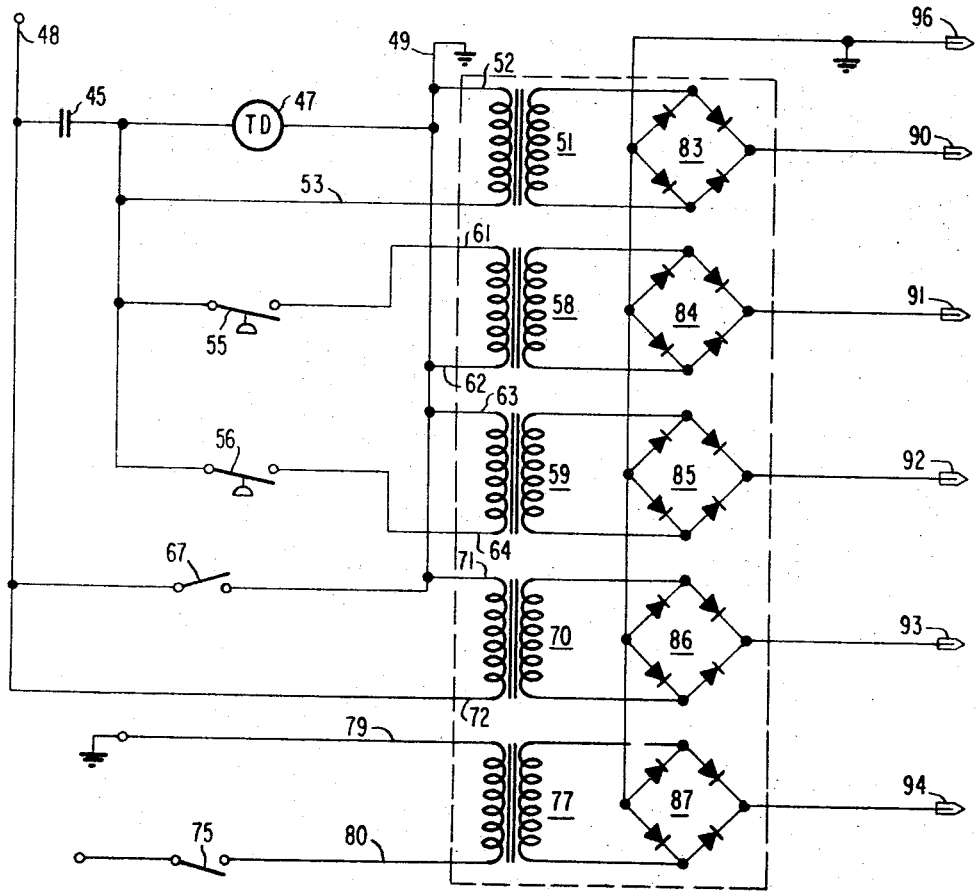
FIG. 3 is a schematic diagram of the interface circuit connecting each press with the input terminals of the data processing system.

Interface circuit 35 is shown in detail in FIG. 3. Lines 48 and 49 are control circuit power lines already present in the control cabinet. Initiation of a cure cycle is accomplished by closing contacts 45 which turns on timer motor 47. During the time motor 47 operates, which is the length of a cure cycle, voltage is applied to the primary side of transformer 51 by lines 52, 53.

Contacts 55, 56 are operated by pressure switches 21, 22 (FIG. 1). When, following the initiation of a cure cycle, steam pressure rises above a predetermined value in bladders 5 (FIG. 1), contacts 55, 56 close, applying voltage to the primary side of transformers 58, 59 over lines 61, 62 and 63, 64.

Contact 67, operated by switch 25 (FIG. 1), is closed whenever the tire molds are closed. During the period when the molds are closed, voltage is applied across the primary of transformer 70 over lines 71, 72.

In those applications where post cure inflation is used, contact 75 is operated by the turn over switch 26 (FIG. 1) on the post cure inflator. As above, voltage is applied across the primary of transformer 77 over lines 79, 80 whenever the post cure inflator accepts or discharges a tire pair.

Transformers 51, 58, 59, 70 and 77 step down whatever control circuit voltage is present to a level which may be connected to an intermediate interface or to the input terminals of the data processing unit, generally 24 volts. Since the data processing unit accepts only D.C. signals, full wave rectifiers 83, 84, 85, 86 and 87 convert the A.C. signal to D.C. in well known fashion. The D.C. voltages, representative of various curing process steps, are available between terminal plugs 90, 91, 92, 93 and 94 and the common line 96.

Data processing unit 36 must be capable of accepting data such as is generated by the sensing switches and interface 35. The unit utilized in this invention is the Model 1800 Data Acquisition and Control System manufactured by International Business Machines. Any equivalent system could be utilized with the appropriate program changes, where necessary.

In addition to the computer program, which is presented below, the data processing unit must be provided with the ranges of acceptable parameters for each tire type and rubber compound. These values are determined solely by the particular type and rubber involved and are not, therefore, set out here.

Parameters other than those set forth herein may be sensed and monitored. For example, temperature, in addition to pressure, of incoming steam may be monitored. Further, analog values of both temperature and pressure may be utilized rather than digital "on-off" signals.

The program set forth below accepts sensed data and compares it with the pre-stored acceptable parameters, as described above. By sensing the length of time a signal appears on the secondary of transformer 51, the length of the cure cycle is monitored and compared to predetermined acceptable values. The length of time signals appear on the secondaries of transformers 58 and 59 yield the pressure-on portion of the cure cycle, which is typically 5% shorter than the full cure cycle. In addition, signals from transformers 58 and 59 appear only when an uncured tire has been loaded into their corresponding tire cavity and may, therefore, be used also as production report data from each individual press cavity.

Opening of the tire mold is indicated by a signal on the secondary of transformer 70. Turn over of the post cure inflator is indicated by a signal on the secondary of transformer 77. Data processing unit 36 translates the relative time of occurrence of these two signals into a time interval signal which is critical in the tire curing process. Finally, the turn-over signal, when there are no intervening exception messages, is interpreted as indicating two completed tires to add to the finished production count. An intervening exception message, which signals a failure in the process, causes the finished production count to remain unaffected by the appropriate number of tires.

Data manipulation by the data processing unit is under the control of the computer program. The program written in Fortran is set forth as follows. The instruction number is given immediately to the left of the Fortran instruction.

```
1        INTEGER SNAP(851)
2        EXTERNAL LOG
3        DIMENSION IZERO(112), IUNDR(112), IOVER(112), ISTAN(112), ISTAT(112)
      1  IDYNA(112), ITEST(112), ISAVE(112), MAB(112),
      2  JTEST(1170),
      3  ITRAC(112), NUTS(112), NUT1(66), NUT2(66)
4        DIMENSION MESS(224), MESS1(123), MESS2(96), MESS3(5)
5        COMMON/INSKEL/ICNT(325), IPR(60), MDTCT, ICHNG, ICHK, MSRCT, MWDAY, NLDCH
      1  (7), NPLCH(7), NBLCH(7), NLDCL(7), MACNO,
      2  ISCS(390),
      3  IDATE(3), IPSW5, MUD, JOE, IPETE, KPETE, NOODA, LSTEM, IHR(24), IJWK, IJMO,
      4  IBOTH, ISTOP, IPRT7, KHOUR, IPWK(2)
6        EQUIVALENCE (MAB(1), ITRAC(1))
7        EQUIVALENCE (NUTS(1), NUT1(1)), (NUTS(67), NUT2(1))
8        EQUIVALENCE (MESS(1), MESS1(1)), (MESS(124), MESS2(1)), (MESS(220), MESS
      1  3(1))
9        EQUIVALENCE (SNAP(1), ICNT(1)), (SNAP(326), IPR(1)), (SNAP(386), MDTCT),
      1  (SNAP(387), ICHNG), (SNAP(388), ICHK), (SNAP(389), MSRCT), (SNAP(390), MW
      2  DAY), (SNAP(391), NLDCH(1)), (SNAP(398), NPLCH(1)), (SNAP(405), NBLCH(1)
      3  ), (SNAP(412), NLDCL(1)), (SNAP(419), MACNO), (SNAP(420), ISCS(1)), (SNAP
      4  (810), IDATE(1)), (SNAP(813), IPSW5, (SNAP(814), MUD), (SNAP(815), JOE),
      5  (SNAP(816), IPETE), (SNAP(817), KPETE), (SNAP(818), NOODA)
10       EQUIVALENCE (SNAP(819), LSTEM), (SNAP(820), IHR(1)), (SNAP(844), IJWK),
      1  (SNAP(845), IJMP), (SNAP(846), IBOTH), (SNAP(847), ISTOP), (SNAP(848), IP
      2  RT7), (SNAP(849), KHOUR), (SNAP(850), IPWK(1))
11       DATA NMACH, IPRO1, ISTPP, MSTAT/112, 40, 390, 18/
12       DATA ISTAN/112*1/
13       DATA NUT1/1,2,3,4,5,6,7,8,9,10,11,12,13,14,15,16,17,18,19,20,21,22
      1  ,23,24,25,26,27,28,29,30,31,32,33,34,35,36,37,38,39,40,41,42,43,44
      2  ,45,46,47,48,49,50,51,52,53,54,55,56,57,58,59,60,61,62,63,64,65,66
      3  /
14       DATA NUT2/67, 68, 91, 92, 93, 94, 95, 96, 97, 98, 99, 100, 101, 102, 103, 104, 105
         1, 106, 107, 108, 109, 110, 111, 112, 69, 70, 71, 72, 73, 74, 75, 76, 77, 78, 79, 80, 8
         21, 82, 83, 84, 85, 86, 87, 88, 89, 90/
15       DATA MESS1/1, 2, 3, 4, 5, 6, 7, 8, 9, 10, 11, 12, 13, 14, 15, 16, 17, 18, 19, 20, 21, 2
         12, 23, 24, 25, 26, 27, 28, 29, 30, 31, 32, 33, 34, 36, 35, 38, 37, 40, 39, 42, 41, 44, 4
         23, 46, 45, 48, 47, 50, 49, 52, 51, 54, 53, 56, 55, 58, 57, 60, 59, 62, 61, 64, 63, 66, 6
         35, 68, 67, 69, 70, 71, 72, 73, 74, 75, 76, 77, 78, 79, 80, 81, 82, 83, 84, 85, 86, 87, 8
         48, 89, 90, 91, 92, 93, 94, 95, 96, 97, 98, 99, 100, 101, 102, 104, 103, 106, 105, 108
         5, 107, 110, 109, 112, 111, 114, 113, 116, 115, 118, 117, 120, 119, 122, 121, 124/
16       DATA MESS2/123, 126, 125, 128, 127, 130, 129, 132, 131, 134, 133, 136, 135, 138
         1, 137, 140, 139, 142, 141, 144, 143, 146, 145, 148, 147, 150, 149, 152, 151, 154, 1
         253, 156, 155, 158, 157, 160, 159, 162, 161, 164, 163, 166, 165, 168, 167, 170, 169
         3, 172, 171, 174, 173, 176, 175, 178, 177, 180, 179, 181, 182, 183, 184, 185, 186, 1
         487, 188, 189, 190, 191, 192, 193, 194, 195, 196, 197, 198, 199, 200, 201, 202, 203,
         5, 204, 205, 206, 207, 208, 209, 210, 211, 212, 213, 214, 215, 216, 217, 218, 219/
17       DATA MESS3/220, 221, 222, 223, 224/
18       DATA ITIMA, ITIMB, ITIMC/4, 12, 6/
19       DATA IBOTH, ILEFT, IRIGH/14, 12, 16/
         DATA ISFT3, ISFT1, ISFT1, ISFT2, ISFT2, ISFT3/7000, 7040, 15000, 15040, 230
         100, 23040/
20       DATA NWIRE, NWORD, NCALL, JTSTS, KSTPP/4, 3, 9, 1170, 13
21       DEFINE FILE 112(3, 320, U, NSRS)
22       DEFINE FILE 18(5,224, U, LTD)
23       DEFINE FILE 49(10,160, U, MXI)
24       DEFINE FILE 499(10,160, U, MIX)
25       READ(MSTAT'1)ITRAC
26       JTST1=JTSTS-1
27       ICT=1
28       DO 20 IG=1,ISTPP,NWORD
29       CALL BITMN(ISCS(IG),4,0,JTEST(ICT),12)
30       CALL BITMN(ISCS(IG),4,4,JTEST(ICT+20),12)
31       CALL BITMAN(ISCS(IG),4,8,JTEST(ICT+20),12)
32       CALL BITMN(ISCS(IG),4,12,JTEST(ICT+30),12)
33       CALL BITMN(ISCS(IG+1),4,0,JTEST(ICT+40),12)
34       CALL BITMN(ISCS(IG+1),4,4,JTEST(ICT+50),12)
35       CALL BITMN(ISCS(IG+1),4,8,JTEST(ICT+60),12)
36       CALL BITMN(ISCS(IG+1),4,12,JTEST(ICT+70),12)
37       CALL BITMN(ISCS(IG+2),4,0,JTEST(ICT+80),12)
38       IC=IC+1
```

TABLE—Continued

```
39          ICT=ICT+NCALL*10
40          IF(IC-KSTPP) 20,19,19
41    19    ICT=ICT-JTSTI
42          IC=0
43    20    CONTINUE
44          IC=0
45          DO 27 L=1,NMACH
46          JCT=NUTS(L)
47          DO 25 I=1,9
48          II=I+10*IC
49          IZERO(JCT)=IEOR(JTEST(II),JTEST(II+1))
50          IF(IZERO(JCT))26,25,26
51    25    CONTINUE
52          I=10
53    26    IZERO(JCT)=I
54    27    IC=IC+1
55          DO 80 L=1,NMACH
56          N=NUTS(L)
57          IF(ITRAC(N)-2)80,56,80
58    56    IK=N*2
59          K=10*(N-1)
60          WRITE(5,206)IK
61          DO 79 I=1,10
62          IN1=I+K
63    79    WRITE(5,208)JTEST(IN1)
64    80    CONTINUE
65          L=0
66          READ(MSTAT'2) IUNDR,IOVER
67          READ(MSTAT'3) ISTAT,IDYNA
68          READ(MSTAT'4) ITEST,ISAVE
69          READ(MSTAT'5) MAB,ISTAN
70    40    L=L+1
71          N=NUTS(L)
72          MACHR=MESS(2*N)
73          MACHL=MESS(2*N-1)
74          KAB=MAB(N)
75          GO TO(52,52,52,41),KAB
76    41    IF(JTEST(10*N)-IBOTH) 42,44,42
77    42    IF(JTEST(10*N)-ILEFT) 43,44,43
78    43    IF(JTEST(10*N)-IRIGH) 50,44,50
79    44    PRT7=IPRT7
80          IF(PRT7/.2-IPRT/2)50,45,50
81    45    WRITE(5,209)N
82    50    IF(IPRT7-ITIMA)130,51,130
83    51    WRITE(5,203) MACHR,MACHL
84          GO TO 130
85    52    IF(IZERO(N)-10) 160,111,160
86    111   IF(JTEST(10*N)-IBOTH) 112,124,160
87    112   IF(JTEST(10*N)-ILEFT) 113,114,160
88    113   IF(JTEST(10*N)-IRIGH) 160,119,160
89    114   MAB(N)=2
90          IF(IPRT7-ITIMB)125,117,125
91    117   WRITE(5,201)MACHR
92          WRITE(7,201) MACHR
93          GO TO 125
94    119   MAB(N)=3
95          IF(IPRT7-ITIMC)125,122,125
96    122   WRITE(5,201)MACHL
97          WRITE(7,201) MACHL
98          GO TO 125
99    124   MAB(N)=1
100   125   IDYNA(N)=0
101         IF(ISTAT(N)-ISTAN(N)) 129,128,129
102   128   IOVER(N)=IOVER(N)+1
103   129   ISTAT(N)=ISTAT(N)+1
104   130   IF(L-NMACH) 40,140,140
105   140   IPRT7=IPRT7+1
106         L=0
107         CALL DATSW(5,IMJ)
108         IF(IMJ-1)149,800,149
109   800   WRITE(5,205)
110   142   L=L+1
111         N=NUTS(L)
112         MACHR=MESS(2*N)
113         MACHL=MESS(2*N-1)
114         IF(1-IUNDR(N))143,143,145
115   143   WRITE(5,204)MACHL,MACHR,IUNDR(N),IOVER(N)
116   144   IUNDR(N)=0
117         IOVER(N)=0
118         IF(N-NMACH)142,149,149
119   145   IF(1-IOVER(N))143,143,144
120   160   IDYNA(N)=IDYNA(N)+1
121         NN=IZERO(N)+1
122         ICC=N-1
123         DO 1260 KK=NN,10
124         II=KK+10*ICC
125         JT=JTEST(II)
126         IF(JT) 99,1161,1160
127   1160  GO TO(1161,99,99,99,99,99,99,99,1161,1161,1161,99,1161,99,1161,99),JT
128   1161  CALL BITST(JT,13,JLP)
129         CALL BITST(JT,14,JRP)
130         CALL BITST(JT,15,JMO)
131         IF(JLP+JRP-4) 1260,1165,1260
132   1165  IF(JMO-2) 1200,1170,1260
133   1260  CONTINUE
134   1290  IF(IDYNA(N)-1) 1300,1293,1300
135   1293  IZERO(N)=0
136         GO TO 163
137   1300  IZERO(N)=0
138         GO TO 130
139   1170  IF(ITEST(N)-2) 1175,1172,1172
140   1172  IF(IDYNA(N)-1) 1173,1175,1173
141   1173  ISAVE(N)=0
142         GO TO 1300
143   1175  ISAVE(N)=ISAVE(N)+1
144         ITEST(N)=1
145         IF(ISAVE(N)-5) 1260,1180,1260
146   1180  JB=MAB(N)
147         GO TO (1183,1181,1182,41),JB
148   1181  WRITE(5,1166) MACHL
149         GO TO 1260
150   1182  WRITE(5,1166) MACHR
```

TABLE—Continued

```
151        GO TO 1260
152  1183  WRITE(5,1166) MACHL,MACHR
           DIMENSION IMARK(NMACH)
           IMARK(NMACH)=81
           CALL CO(11101,IMARK(1),IMARK(NMACH))
153        GO TO 1260
154  1200  IF(ITEST(N)-1) 1205,1205,1210
155  1205  ISAVE(N)=0
156  1210  ISAVE(N)=ISAVE(N)+1
157        ITEST(N)=2
158        IF(N-34) 1220,1220,1215
159  1215  IF(N-68) 1221,1221,1216
160  1216  IF(N-112) 1222,1222,130
161  1220  IF(ISAVE(N)-9) 1260,1225,1170
162  1221  IF(ISAVE(N)-8) 1260,1225,1170
163  1222  IF(ISAVE(N)-11)1260,1225,1170
164  1225  JB=MAB(N)
165        GO TO(1232,1230,1231,41),JB
166  1230  WRITE(5,207) MACHL
167        GO TO 1300
168  1231  WRITE(5,207) MACHR
169        GO TO 1300
170  1232  WRITE(5,207) MACHL,MACHR
171        GO TO 1300
172    99  WRITE(5,1267) N
173        GO TO 1260
174   163  JB=MAB(N)
175        GO TO (165,300,310,130),JB
176   165  ICNT(MACHL)=ICNT(MACHL)+1
177   310  ICNT(MACHR)=ICNT(MACHR)+1
178   168  ISTAN(N)=ISTAN(N)-1
179        IF(ISTAN(N)-ISTAT(N))170,170,169
180   169  IUNDR(N)=IUNDR(N)+1
181   170  ISTAT(N)=0
182        GO TO 130
183   300  ICNT(MACHL)=ICNT(MACHL)+1
184        GO TO 168
185   149  IF(IPRT7=IPRO1)150,150,141
186   141  IPRT=0
187   150  WRITE(MSTAT'2)IUNDR,IOVER
188        WRITE(MSTAT'3)ISTAT,IDYNA
189        WRITE(MSTAT'4)ITEST,ISAVE
190        WRITE(MSTAT'5)MAB
191        IT=0
192        CALL CLOCK(IPSW)
193        IF(IPSW-LSFT3)218,216,211
194   211  IF(IPSW-ISFT1)216,216,212
195   212  IF(IPSW-LSFT1)218,216,213
196   213  IF(IPSW-ISFT2)216,216,214
197   214  IF(IPSW-LSFT2)218,216,215
198   215  IF(IPSW-ISFT3)216,216,218
199   216  IF(IPWK(2))175,217,175
200   217  CALL EONS
201        IPWK(2)=1
202        GO TO 175
203   218  IPWK(2)=0
204   175  CALL DATSW(3,IT)
205        IF(IT-1)177, 176, 177
206   176  WRITE(3,500)IPSW
207        WRITE(3,200)ICNT
208   177  IF(ISTOP-1) 1777,1778,1777
209  1777  WRITE(112'1) SNAP
210  1778  CALL CLOCK (IPSW5)
211        J=IPSW5/1000*1000
212        IREM=IPSW5-J
213        IF(IREM-483) 179,1780,1779
214  1779  IF(IREM-517) 1780,1780,179
215  1780  CALL QUEUE (LOG,23,1)
216   179  IF(ISTOP-2) 181,180,181
217   180  CALL LEVEL(7)
218        ISTOP=3
219   181  CALL INTEX
220   200  FORMAT('BAGOMATIC PRODUCTION',//,11(2015,//),415,//,'TIRE WATCH-
        1  CASE',2(//,1915),//,'  GREEN TIRE PRODUCTION/MACHINE',2(//,2813))
221   201  FORMAT(1H  , 'CAVITY',2X,I4,2X,'NOT CURING'/)
222   203  FORMAT(1H  'CAVT.',2X,214,2X,'DOWN-SET BY OPERATOR',/)
223   204  FORMAT(4(6X,I3))
224   205  FORMAT('  CAVITIES    UNDER AND OVER-CURES/SHIFT')
225   206  FORMAT('  CAVT.  ',I3)
226   207  FORMAT(1H 'EXCESSIVE TIME BETWN CURES ON CAVIT',2X,I4,2X,I4,/)
227   208  FORMAT(2X,I2)
228   209  FORMAT('  IF MACHINE NO.',2X,I4,2X,'IS NOW AVAILABLE—RESET MAB C
        1  ODE.'/)
229   500  FORMAT(I5)
230  1166  FORMAT('    OVERCURE CONDITION ON CAVIT',2X,I4,2X,I4,/)
231  1267  FORMAT('    ILLEGAL BIT CONFIGURATION ON MACH',2X,I4/)
232   210  END
```

As will be readily apparent to those skilled in the art, numerous modifications may be made in the disclosure herein without departing from the scope of this invention. Changes may be made in the manner in which process parameters are sensed and in the identity of the particular parameters without leaving the scope of this invention. While this invention has been described in combination with a steam bladder press, it is intended that the invention incorporate other types of presses, such as bladderless presses and bladder presses operated by hot water or air. Finally, as is realized by anyone skilled in the art, modifications in the computer program set forth herein may be made without changing the purpose or result of the program. It is intended that the invention be limited only by the following claim.

What is claimed is:

1. A method of monitoring a plurality of independent tire molding and curing apparatuses used for the manufacture of tires employing a central data processor comprising the steps of:

sensing the times of occurrence of discrete predetermined process conditions during the molding and curing cycles of tires in said apparatuses, generating signals at each of said times of occurrence for each of said apparatuses so that a set of signals is generated for each of said apparatuses, periodically scanning said sets of signals associated with said plurality of apparatuses, converting said sets of signals into second sets of signals corresponding to selected time intervals of critical importance in the tire molding and curing cycles, comparing said second sets of signals with stored reference data which corresponds to predetermined allowable time intervals for each tire being manufactured including the acceptable time intervals for each tire type and rubber compound used in the manufacture of said tire types, generating an output signal for each tire produced by each of said plurality of apparatuses dependent upon said comparisons and making a permanent record of said output signals dependent on said comparisons for each tire produced by said plurality of apparatus, respectively.

References Cited

UNITED STATES PATENTS

| | | | |
|---|---|---|---|
| 3,649,729 | 3/1972 | Davis et al. | 264—40 |
| 3,489,833 | 1/1970 | Lehnen | 264—315 |
| 3,443,280 | 5/1969 | Hugger | 264—40 X |
| 2,991,531 | 7/1961 | Gates | 425—169 |
| 3,271,485 | 9/1966 | Canfield | 264—40 X |

JAN H. SILBAUGH, Primary Examiner

U.S. Cl. X.R.

235—151.13; 264—315, 326

UNITED STATES PATENT OFFICE
CERTIFICATE OF CORRECTION

PATENT NO. : 3,836,614
DATED : September 17, 1974
INVENTOR(S) : Ernst J. Neugroschl It is certified that error appears in the above-identified patent and that said Letters Patent are hereby corrected as shown below:

Column 2, line 12, "times" should read -- tires --.

In the computer program, beginning under Columns 5 and 6,
    line 18, "16" should read -- 10 --.
    line 19, "DATA ISFT3, ISFT1, ISFT1, ISFT2, ISFT2, ISFT3" should read -- DATA LSFT3, ISFT1, LSFT1, ISFT2, LSFT2, ISFT3 --.
    line 30, "JTEST(ICT+20),12)" should read -- JTEST(ICT+10), 12) --.

In the computer program, under Columns 7 and 8,
    line 41, "ICT=ICT-JTSTI" should read -- ICT=ICT-JTST1 --.
    line 80, "IF(PRT7/.2-IPRT/2)" should read -- IF(PRT7/.2-IPRT7/2) --.
    line 85, "160, 111, 166" should read -- 160, 111, 160 --.

In the computer program, under Columns 9 and 10,
    line 185, "(IPRT7=IPR01)" should read -- (IPRT7-IPR01) --.
    line 186, "IPRT=0" should read -- IPRT7=0 --.
    line 211, "J-IPSW5" should read -- J=IPSW5 --.
    line 220, "//,11(2015,//),415,//,'TIRE WATCH-1CASE',2(//,1915)" should read -- //,11(2015,//),415,//,'TIRE WATCH-1CASE',2(//,1915) --.
    line 228, "-RESET MAB C 1 ODE.'/)" should read -- --RESET MAB C 1ODE.'/) --.

Signed and Sealed this seventh Day of October 1975

[SEAL]

Attest:

RUTH C. MASON
*Attesting Officer*

C. MARSHALL DANN
*Commissioner of Patents and Trademarks*